Patented July 5, 1949

2,475,265

UNITED STATES PATENT OFFICE 2,475,265

PROCESS FOR CARRYING OUT COUPLING REACTIONS

Willy Widmer, Bottmingen, and Hans Mayer, Basel, Switzerland, assignors to Ciba Limited, a Swiss firm No Drawing. Application April 16, 1947, Serial No. 741,934. In Switzerland April 23, 1946

1 Claim. (Cl. 260—182)

According to this invention coupling reactions are carried out in the absence of heavy metals capable of forming complexes and in the presence of a water-soluble aliphatic amine.

This new method is of general application, but is especially applicable to coupling reactions in an alkaline medium. It is principally of advantage in the case of coupling reactions which occur with difficulty. As coupling reactions which occur with difficulty there may be mentioned: The coupling of diazo-components or coupling components which are easily capable of decomposition under the reaction conditions usually required; coupling reactions with components which react slowly; coupling reactions which require a strongly alkaline medium; and coupling reactions with sparingly soluble components. Among the more especially difficult coupling reactions are those in which more than one of the above mentioned difficulties exist simultaneously. As the difficulties above described arise especially in the case of coupling reactions leading to dyestuffs capable of forming heavy metal complexes, for example, ortho:ortho'-dihydroxyazo-dyestuffs, the present method is in some cases especially advantageous for the production of such metallisable dyestuffs in the metal-free state. A few examples of components in the coupling reactions of which the foregoing difficulties arise, are mentioned below. It must, however, be recognized that the course of a coupling reaction always depends on both of the components taking part, that is to say, the components mentioned are not to be regarded as difficult to couple in an absolute sense, but only in relation to certain combinations. As diazo-components in this connection there may be mentioned, for example, diazotized aminoazo-dyestuffs, and principally diazotized aminopoly-azo-dyestuffs such, for example, as diazo-compounds obtained by coupling a diazotized amino-salicyclic acid with a 1-aminonaphthalene coupling in the 4-position, diazotizing the resulting aminoazo-dyestuff and also coupling it with a 1-aminonaphthalene coupling in the 4-position, and further diazotizing the resulting amino-disazo-dyestuff (sluggish in reaction and easily decomposable).

The present process is especially useful for conducting coupling reactions with ortho-hydroxy-diazo-compounds, principally those which are obtainable from 3:3'-dihydroxy-4:4'-diaminodiphenyl such as tetrazotized 3:3'-dihydroxy-4:4'-diaminodiphenyl (sluggish in reaction and sparingly soluble), or diazo-azo-compounds from 1 mol of tetrazotized 3:3'-dihydroxy-4:4'-diaminodiphenyl and 1 mol of a coupling component: (for example diazo-azo-compounds from 1 mol of tetrazotized 3:3'-dihydroxy-4:4'-diaminodiphenyl and 1 mol of a coupling component containing at least one sulfonic acid group and capable of coupling in a position vicinal to a hydroxyl group).

As coupling components in the use of which the present process is of special benefit, particularly when they are to be coupled with the first mentioned diazo-components obtainable from 3:3'-dihydroxy-4:4'-diaminodiphenyl, there may be mentioned: Compounds free from sulfonic acid groups and capable of coupling in a position vicinal to a hydroxyl group, for example, hydroxyquinolines, for instance, 8-hydroxyquinoline (easily oxidisable in an alkaline medium), and especially naphthalene derivatives such as amino-hydroxynaphthalenes, for example, 2-amino-7-hydroxynaphthalene (easily oxidisable in an alkaline medium), halogenated hydroxy-naphthalenes, for example, 5:8-dichloro-1-hydroxynaphthalene (easily oxidisable in an alkaline medium), and principally dihydroxynaphthalenes free from further substituents, such as 1:3-, 1:5-, 2:3-, 2:5-, 2:6- or 2:7-dihydroxynaphthalene (easily oxidisable in an alkaline medium).

The preparation of the diazo-compounds may be carried out in the manner usual for the components in question. In some cases it is of advantage to neutralise the diazo-solution or diazo-suspension by the addition of an agent binding acid, and, if desired, separating the diazo-compound by filtration.

Among the water-soluble aliphatic amines to be added for the coupling reaction there come into consideration principally those of which the alkyl residues contain only few carbon atoms. Primary, secondary or tertiary amines may be used. Moreover, it is also possible to use mixtures of two or more amines. Especially valuable results are obtained by using water-soluble aliphatic amines which contain at least once the atomic grouping

in which X represents hydrogen or the group —CH$_2$—CH$_2$—, that is to say, amines which contain oxygen bound in the form of an alcohol or ether, for example, monoethanolamine, diethanolamine, triethanolamine, tripropanolamine or mixtures thereof, or the compound of the formula

One ether-bridge may link together two alkyl residues bound to the same nitrogen atom as, for example, in the case of morpholine (tetrahydro-1:4-oxazine), 4-methyl-morpholine, 4-ethyl-morpholine or 4-(β-hydroxy-ethyl)-morpholine. In otherwise difficult coupling reactions the amines act as solution promoters and at the same time as relatively strong alkalies without, however, having the tendency of caustic alkalies of furthering decomposition. Accordingly, on the one hand, the coupling reaction is favored and, on the other, undesired side reactions are actively combated. In general relatively small quantities of the aliphatic amines suffice, that is to say, one or a few mols of an aliphatic amine per diazo-group. In those cases where the aliphatic amine serves principally as a solution promoter it is generally of advantage to use it in somewhat larger quantities. Furthermore, it is possible to add, besides the aliphatic amine to be used in these cases advantageously in relatively small quantities, a further, principally water-soluble organic solvent. For this purpose basic or neutral solvents are especially suitable. As examples there may be mentioned pyridine, methyl alcohol, ethyl alcohol, acetone and dioxane. The coupling reaction may be carried out, for example, by bringing together the diazo-compound in the form considered advantageous and the coupling component, and adding the aliphatic amine before, during or after the beginning of the reaction. The addition of alkali is frequently unnecessary. When this is necessary the alkali may be added, for example, subsequently or simultaneously with the diazo-compound. The temperature of coupling is advantageously kept low, especially at the beginning of the reaction, but, if desired, may be raised in the course of the reaction. The coupling mass is worked up in known manner, for example, by removing the volatile constituents by distillation, or by concentrating by evaporation, by dilution, by reducing the pH value by the addition of acid, by salting out, etc.

It is known that coupling reactions can with advantage be carried out in the presence of heavy metals capable of forming complexes, and that in certain cases such coupling reactions can be carried out with the use of diazo-compounds which contain the heavy metal bound in complex union and also an aliphatic amine in the complex.

Thus, for example, it has been recommended to couple a diazotized complex chromium-triethanolamine compound of 4-amino-1-hydroxy-benzene-2-carboxylic acid-6-sulfonic acid with salicyclic acid. As compared with this known process, the process of the present invention has the advantage of a considerably wider range of application. Moreover, as compared with the known method of working with the addition of pyridine, which has been proposed for conducting numerous coupling reactions, the process of the present invention is generally to be preferred because the unpleasantness of working with pyridin, which is especially pronounced when dealing with large batches, can be avoided.

The dyestuffs obtainable by the invention are in part known. The known and also the new dyestuffs so obtainable are suitable, for example, for dyeing a very wide range of materials, especially cellulose fibers, such as cotton, artificial silk and staple fibers of regenerated cellulose, but can also be used for dyeing animal fibers such as wool, silk and leather. When the dyestuffs contain metallisable groups they may be converted in substance, in the dyebath or on the fiber into complex metal compounds, for example, copper, chromium, iron, nickel or cobalt compounds. The conversion into such complex metal compounds, which compounds may contain a plurality of metals in the complex, is carried out by the known methods in an acid, neutral or alkaline solution, with or without suitable additions such as salts of inorganic or organic acids, salts of acids forming complexes such as tartaric acid or aminoacetic acid, in the presence or absence of a diluent or suspension medium such as pyridine or glycerine, and under atmospheric or superatmospheric pressure. It is especially useful to produce complex metal compounds, more particularly complex copper compounds, in substance when the corresponding metal-free dyestuffs have too weak an affinity and the metalliferous dyestuffs are sufficiently soluble in the usual dyebaths. Furthermore, many of the complex metal compounds produced in substance, especially cobalt and/or nickel compounds, can be used for coloring masses or solutions thereof such as nitrocellulose lacquers, artificial resins and spinning solutions.

When disazo-dyestuffs obtained by the present process contain only few groups imparting solubility and possess an adequate or good affinity for cellulose fibers in the metal-free condition, they may with advantage be treated by known general methods on the fiber or in the dyebath or partially on the fiber and partially in the dyebath with agents yielding metal. Advantageously, however, the process of specification No. 2,148,659 is used, in which first the dyeing and then the treatment with the agent yielding metal are conducted in the same bath. As agents yielding metal there preferably come into consideration in this connection those which are stable towards alkaline solutions, such as complex copper tartrates and others.

The following examples illustrate the invention, the parts being by weight:

*Example 1*

21.6 parts of 3:3'-dihydroxy-4:4'-diaminodiphenyl are tetrazotized in the usual manner. The tetrazo compound is neutralized, separated by filtration, and introduced into a suspension of 33 parts of 2:6-dihydroxynaphthalene in 40 parts of water and 15 parts of triethanolamine cooled to 2° C. The whole is stirred while gradually increasing the temperature to 30–35° C. in the course of 24 hours until the coupling is complete. After dilution with water, the precipitated dyestuff is separated by filtration and washed. It is dried under reduced pressure, and a product is obtained which dyes cellulose fibers by the single bath or 2-bath after-coppering process navy blue tints, which are fast to washing and light.

By using twice the quantity of triethanolamine the coupling proceeds somewhat more rapidly.

*Example 2*

The tetrazo compound from 21.6 parts of 3:3'-dihydroxy-4:4'-diaminodiphenyl is prepared in the usual manner, separated, and introduced into a solution of 33 parts of 2:6-dihydroxynaphthalene in 40 parts of water and 20 parts of diethanolamine cooled to 2° C. The whole is stirred while slowly increasing the temperature until coupling is complete. After dilution with water, the precipitated dyestuff is separated by filtration and washed. It is dried under reduced pressure. The dyestuff has the same properties as the dyestuff obtained as described in Example 1.

The same result is obtained by using 30 parts of a technical mixture of mono-, di-, and triethanolamine.

*Example 3*

The tetrazo compound from 21.6 parts of 3:3'-dihydroxy-4:4'-diaminodiphenyl is prepared in the usual manner, separated, and introduced at 5–10° C. into a solution of 33 parts of 2:3-dihydroxynaphthalene in 50 parts of water and 20 parts of monoethanolamine. The whole is stirred for several hours at room temperature until the coupling is complete. After dilution with water, filtration, and drying under reduced pressure, a dark violet-blue powder is obtained which dissolves in dilute caustic soda solution with a blue coloration and dyes cellulose fibers by the single bath or 2-bath after-coppering process reddish blue tints which are fast to washing and light.

*Example 4*

The separated tetrazo compound from 21.6 parts of 3:3'-dihydroxy-4:4'-diaminodiphenyl is neutralized, separated by filtration, and introduced into a solution of 22.4 parts of 2-hydroxynaphthalene-7-sulfonic acid in 160 parts of water and 20 parts of potassium carbonate. The whole is stirred at 10–15° C. until formation of the monoazo dyestuff is complete and the tetrazo compound can no longer be detected, and the monoazo dyestuff is separated by filtration. The dyestuff paste is introduced into a solution of 16.5 parts of 2:7-aminonaphthol in 30 parts of diethanolamine. The whole is stirred while gradually raising the temperature to 30–35° C. until the coupling is complete. The dyestuff is worked up in the usual manner and dried under reduced pressure. A bluish-black powder is obtained which dyes cellulose fibers by the single bath or 2-bath after-coppering process reddish navy blue tints, which are fast to washing and light.

By using 2:6-dihydroxynaphthalene or 2:6-hydroxymethoxy-naphthalene, instead of 2:7-aminonaphthol, a similar dyestuff is obtained.

*Example 5*

The separated tetrazo compound from 21.6 parts of 3:3'-dihydroxy-4:4'-diaminodiphenyl obtained in the usual manner is neutralized, separated by filtration, and introduced into a solution of 22.4 parts of 2-hydroxynaphthalene-7-sulfonic acid in 160 parts of water and 20 parts of potassium carbonate. The whole is stirred at 10–15° C. until the formation of the monoazo-dyestuff is complete and the tetrazo compound can no longer be detected, and the monoazo dyestuff is separated by filtration. The dyestuff paste is introduced into 100 parts of pyridine. A suspension of 22 parts of 5:8-dichloro-1-hydroxynaphthalene in 50 parts of water and 20 parts of diethanolamine is then added, and the whole is stirred while slowly raising the temperature to 30–35° C. until the coupling is complete. The dyestuff is worked up in the usual manner and dried under reduced pressure. A blue-black powder is obtained which dissolves in water with a blue coloration and in caustic soda solution with a greenish blue coloration, and dyes cellulose fibers by the single bath or 2-bath after-coppering process pure reddish navy blue tints which are fast to washing and light.

By using 2:3-dihydroxynaphthalene, instead of 5:8-dichloro-1-hydroxynaphthalene, a dyestuff is obtained which yields somewhat more reddish navy blue tints.

*Example 6*

The separated tetrazo compound obtained from 21.6 parts of 3:3'-dihydroxy-4:4'-diaminodiphenyl in the usual manner is introduced into a solution of 39 parts of the monoazo dyestuff (obtained by coupling 2-aminobenzene-1-carboxylic acid with 2-amino-5-naphthol-7-sulfonic acid in an acid medium) in 200 parts of water and 30 parts of potassium carbonate. The whole is stirred at 10–15° C. until the tetrazo compound can no longer be detected in the reaction mixture, and the resulting disazodyestuff is separated. The latter is introduced into a solution of 16 parts of 2-hydroxynaphthalene in 80 parts of water and 30 parts of diethanolamine. The whole is stirred while gradually raising the temperature to 30–40° C. until the coupling is complete. The dyestuff is worked up in the usual manner, purified, and dried under reduced pressure. A dark blue powder is obtained which dissolves in sodium carbonate solution with a greenish blue coloration and dyes cellulose fibers by the single bath or 2-bath after-coppering process clear reddish blue tints which are fast to washing and light.

*Example 7*

The separated tetrazo compound obtained from 21.6 parts of 3:3'-dihydroxy-4:4'-diaminodiphenyl in the usual manner is introduced into a suspension of 33 parts of 2:6-dihydroxynaphthalene in 100 parts of water. 40 parts of morpholine are introduced dropwise at a temperature of 5–10° C. in the course of one hour, and the whole is stirred at room temperature until the coupling is complete. The completely precipitated dyestuff is separated by filtration, washed with warm water, and dried under reduced pressure. A blue-black powder is obtained which dissolves in caustic soda solution with a greenish blue coloration, and dyes cellulose fibers by the single bath or 2-bath after-coppering process navy blue tints which are fast to light and washing.

*Example 8*

31 parts of the disazo dyestuff, (obtained by diazotising 4-amino-1-hydroxybenzene-2-carboxylic acid and coupling it with 1-aminonaphthalene-7-sulfonic acid, separating the aminoazo dyestuff, again diazotising and coupling with a further molecular proportion of 1-amino-naphthalene-7-sulfonic acid) are diazotised in the usual manner by the indirect method. The diazo compound is cautiously neutralized in the cold, and introduced into a solution of 8.0 parts of 8-hydroxyquinoline in 50 parts of water and 12 parts of diethanolamine. The whole is stirred at room temperature until the coupling is complete, and the resulting trisazo-dyestuff is separated in the usual manner. After drying the dyestuff and grinding it, a blue-black powder is obtained which dissolves in water with a blue coloration and dyes cellulose fibers by the single bath or 2-bath after-coppering process navy blue tints which are fast to washing and light.

*Example 9*

The diazo compound produced in the usual manner from the disazo dyestuff (obtained by diazotising 15.3 parts of 4-amino-1-hydroxy-2-benzoic acid and coupling with 22.3 parts of 1-aminonaphthalene-7-sulfonic acid, again diazotising and coupling with 14.3 parts of 1-naphthylamine) is introduced in the form of a fine jet into an ice-cold solution of 23.9 parts of 2-amino-5-naphthol-7-sulfonic acid in 300 parts of water, and 50 parts of diethanolamine. When one half of the diazo compound has been added, a cold solution of 15 parts of sodium carbonate in 100 parts of water is introduced dropwise, and then the remainder of the diazo suspension is added. The whole is stirred for a few hours, then heated to 65° C., and the blue trisazo dyestuff is precipitated with 200 parts of sodium chloride. After drying and grinding, a blue-black powder is obtained which dissolves in water with a blue coloration and dyes cellulose fibers by the single bath or 2-bath after-coppering process blue tints which are fast to washing and light.

*Example 10*

100 parts of cotton are entered at 40° C. into a dyebath containing 1.5 parts of the dyestuff obtained as described in the first paragraph of Example 5 and 3 parts of sodium carbonate in 3000 parts of water, the temperature is raised to 90–95° C., 30 parts of Glauber salt are added, and dyeing is carried on for ¾ hour at 90–95° C. The dyebath is then cooled to 80° C., the requisite quantity of a solution of complex copper tartrate (containing 0.3 part of copper in complex union) rendered weakly alkaline with sodium carbonate is added, and the cotton is treated for about ½ hour at 80–90° C. The goods are then rinsed and, if desired, soaped for a short time. The cotton is dyed a fast navy blue tint.

What we claim is:

A process for carrying out a coupling reaction in the absence of heavy metals capable of forming complexes, which comprises coupling one molecular proportion of tetrazotized 3:3'-dihydroxy-4:4'-diaminodiphenyl with two molecular proportions of 2:6-dihydroxynaphthalene in the presence of at least one molecular proportion of an ethanolamine.

WILLY WIDMER.
HANS MAYER.

REFERENCES CITED

The following references are of record in the file of this patent:

UNITED STATES PATENTS

| Number | Name | Date |
|---|---|---|
| 1,210,751 | Anderwert et al. | Jan. 2, 1917 |
| 2,424,066 | Straub et al. | July 15, 1947 |
| 2,427,537 | Straub et al. | Sept. 16, 1947 |

FOREIGN PATENTS

| Number | Country | Date |
|---|---|---|
| 102,381 | Great Britain | Jan. 4, 1917 |
| 374,498 | Great Britain | June 13, 1932 |

Certificate of Correction

July 5, 1949.

Patent No. 2,475,265.

WILLY WIDMER ET AL.

It is hereby certified that errors appear in the printed specification of the above numbered patent requiring correction as follows:

Column 3, line 66, for "pyridin" read *pyridine*; column 4, line 1, for "shuffs" read *stuffs*; line 35, for the word "specification" read *Patent*;

and that the said Letters Patent should be read with these corrections therein that the same may conform to the record of the case in the Patent Office.

Signed and sealed this 22nd day of November, A. D. 1949.

[SEAL]

THOMAS F. MURPHY,
*Assistant Commissioner of Patents.*